United States Patent
Tagami et al.

(10) Patent No.: US 9,816,835 B2
(45) Date of Patent: Nov. 14, 2017

(54) INFORMATION DISPLAY DEVICE, INFORMATION DISPLAY METHOD, AND INFORMATION DISPLAY PROGRAM

(71) Applicant: JVC KENWOOD CORPORATION, Yokohama-shi, Kanagawa (JP)

(72) Inventors: Katsunori Tagami, Yokohama (JP);
Tomoaki Yoshida, Yokohama (JP);
Tomonori Nagahama, Yokohama (JP);
Yoshihiko Imano, Yokohama (JP);
Takeshi Nishiumi, Yokohama (JP);
Ichiro Shishido, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/178,996

(22) Filed: Jun. 10, 2016

(65) Prior Publication Data

US 2016/0290824 A1 Oct. 6, 2016

Related U.S. Application Data

(63) Continuation of application No. PCT/JP2014/074104, filed on Sep. 11, 2014.

(30) Foreign Application Priority Data

Mar. 31, 2014 (JP) ................. 2014-070814

(51) Int. Cl.
*G08G 1/09* (2006.01)
*G01C 21/36* (2006.01)
(Continued)

(52) U.S. Cl.
CPC ......... *G01C 21/3691* (2013.01); *G01C 21/26* (2013.01); *G06T 11/203* (2013.01);
(Continued)

(58) Field of Classification Search
CPC combination set(s) only.
See application file for complete search history.

(56) References Cited

U.S. PATENT DOCUMENTS 7,564,376 B2 * 7/2009 Jang ................. G08G 1/096716
340/905
8,170,619 B2 * 5/2012 Kim ................. H04M 1/72544
345/156
(Continued)

FOREIGN PATENT DOCUMENTS

JP H6-103200 A 4/1994
JP 9-62542 A 3/1997
(Continued)

OTHER PUBLICATIONS

Official Action dated Nov. 22, 2016 in the counterpart Japanese application No. 2014-070814.

*Primary Examiner* — Travis Hunnings
(74) *Attorney, Agent, or Firm* — Nath, Goldberg & Meyer; Jerald L. Meyer; Stanley N. Protigal

(57) ABSTRACT

An event information memory stores an occurrence time of an event so as to cause the occurrence time of the event to correspond to each of monitoring targets in which the events occurred (or are scheduled to occur) among a plurality of the monitoring targets. Based on position information for displaying each of a plurality of monitoring targets on a general view, a controller instructs control to draw an event display image on the general view so as to cause the event display image to correspond to the monitoring target in which the event occurred (or scheduled to occur), the monitoring target being stored in the event information memory. The event display image includes: a circular portion indicating a predetermined time in a circumferential direction, an indicator
(Continued)

indicating a current hour or minute, and an event occurrence time display portion caused to correspond to the occurrence time of the event.

9 Claims, 11 Drawing Sheets

(51) Int. Cl.
    *G01C 21/26*     (2006.01)
    *G06T 11/20*     (2006.01)
    *G09G 5/37*     (2006.01)
    *G09G 5/14*     (2006.01)
    *G09G 5/397*     (2006.01)

(52) U.S. Cl.
    CPC ............... *G09G 5/14* (2013.01); *G09G 5/37* (2013.01); *G09G 5/397* (2013.01); *G09G 2340/14* (2013.01); *G09G 2380/10* (2013.01)

(56) References Cited

U.S. PATENT DOCUMENTS

| | | | |
|---|---|---|---|
| 8,509,971 B1* | 8/2013 | Isailovski | B61L 15/009 |
| | | | 246/182 A |
| 9,454,402 B2* | 9/2016 | Lavery | G06F 9/5011 |
| 2008/0207274 A1* | 8/2008 | Kim | H04M 1/72544 |
| | | | 455/566 |
| 2011/0070924 A1* | 3/2011 | Kim | G06Q 10/02 |
| | | | 455/566 |
| 2015/0254107 A1* | 9/2015 | Lavery | G06F 9/5011 |
| | | | 715/772 |

FOREIGN PATENT DOCUMENTS

| | | |
|---|---|---|
| JP | 2001-337933 A | 12/2001 |
| JP | 2001-344628 A | 12/2001 |
| JP | 2003-162504 A | 6/2003 |
| JP | 2004-234649 A | 8/2004 |
| JP | 2013-6385 A | 1/2013 |
| WO | 2012/091107 A1 | 7/2012 |

* cited by examiner

INFORMATION DISPLAY DEVICE, INFORMATION DISPLAY METHOD, AND INFORMATION DISPLAY PROGRAM

CROSS REFERENCE TO RELATED APPLICATION

This application is a Continuation of PCT Application No. PCT/JP2014/074104 filed on Sep. 11, 2014, and claims the priority of Japanese Patent Application No. 2014-070814 filed on Mar. 31, 2014, the entire contents of both of which are incorporated herein by reference.

BACKGROUND

The present disclosure relates to an information display device, an information display method, and an information display program, which display information regarding a monitoring target on a display.

An information display device that displays information regarding a monitoring target on a display is used for a variety of purposes. For example, on a road on which vehicles run, a road traffic information display device is installed which uses the road as a monitoring target, and displays information regarding congestion and closure of the road on the display.

A second example is the display of a car navigation device which sometimes displays information regarding congestion and closure of a road on a map.

In the third example, in Japanese Unexamined Patent Application Publication No. H06-103200, a network monitoring system is described which displays on the display a physical arrangement of instruments composing a network, and clearly indicates an interference occurrence position on the display when the interference occurs in the instrument. In this example, the instruments which compose the network are such monitoring targets, and the information regarding the monitoring target is the interference that occurs in the instruments.

SUMMARY

In each of the first to the third examples, the congestion, the road closure, the interference, the failure or the like, which occur with regard to the monitoring targets, is referred to as an event. Each of the conventional information display devices mentioned above can recognize whether or not the event occurs; however, they cannot recognize the occurrence time of the event and the duration of the event.

The conventional information display device sometimes displays detailed information such as the occurrence time, duration or the like of the event by a bubble or a pop-up window. The bubble or the pop-up window is not preferable since the bubble or the pop-up window hides other information.

Moreover, in each case of the first and second examples, it is not easy for a driver to read the detailed information which is formed of a sentence described in the bubble or the pop-up window during driving, and it is not preferable to do the reading in terms of road safety.

What is desired is a display mode, which enables intuitive recognition for the temporal information of the event regarding the monitoring target. The event regarding the monitoring target can be any event that occurred in the past with regard to the monitoring target, an event that is occurring at the present with regard to the monitoring target, and an event that will occur in the future with regard to the monitoring target.

A first aspect of the embodiments provides an information display device including: an event information memory configured to store an occurrence time of an event, so as to cause the occurrence time of the event to correspond to each of monitoring targets in which the events occurred, or monitoring targets in which the events are scheduled to occur among a plurality of the monitoring targets; and a drawing controller configured to instruct control to draw an event display image on the general view, based on position information for displaying each of a plurality of monitoring targets on a general view, so as to cause the event display image to correspond to the monitoring target stored in the event information memory, wherein the drawing controller draws, as the event display image: a circular portion indicating a predetermined time in a circumferential direction; an indicator indicating a current hour or minute; and an event occurrence time display portion displayed on the circular portion and caused to correspond to the occurrence time of the event.

A second aspect of the embodiments provides an information display method including: storing an occurrence time of an event so as to cause the occurrence time of the event to correspond to each of monitoring targets in which the events occurred, or monitoring targets in which the events are scheduled to occur among a plurality of the monitoring targets; and based on position information for displaying each of a plurality of the monitoring targets on a general view, displaying an event display image on the general view so as to cause the event display image to correspond to the monitoring target stored in the event information memory, wherein the event display image is an image including: a circular portion indicating a predetermined time in a circumferential direction; an indicator indicating a current hour or minute; and an event occurrence time display portion displayed on the circular portion and caused to correspond to the occurrence time of the event.

A third aspect of the embodiments provides an information display program stored in a non-transitory computer readable storage medium for causing a computer to execute: a readout step of reading from an event information memory, an occurrence time of an event, the occurrence time corresponding to each of monitoring targets in which the events occurred, or monitoring targets in which the events are scheduled to occur among a plurality of the monitoring targets; and a drawing step of drawing based on position information for displaying each of a plurality of monitoring targets on a general view, an event display image on the general view so as to allow the event display image to correspond to the monitoring target in which the event occurred, or the monitoring target in which the event is scheduled to occur, the events being read out from the event information memory, wherein the drawing step causes the computer to execute a step of drawing as the event display image: a circular portion indicating a predetermined time in a circumferential direction; an indicator indicating a current hour or minute; and an event occurrence time display portion displayed on the circular portion and caused to correspond to the occurrence time of the event.

DETAILED DESCRIPTION

A description is made below of an information display device, information display methods, and information display programs of the respective embodiments with reference to the accompanying drawings.

First Embodiment

Figure 1:
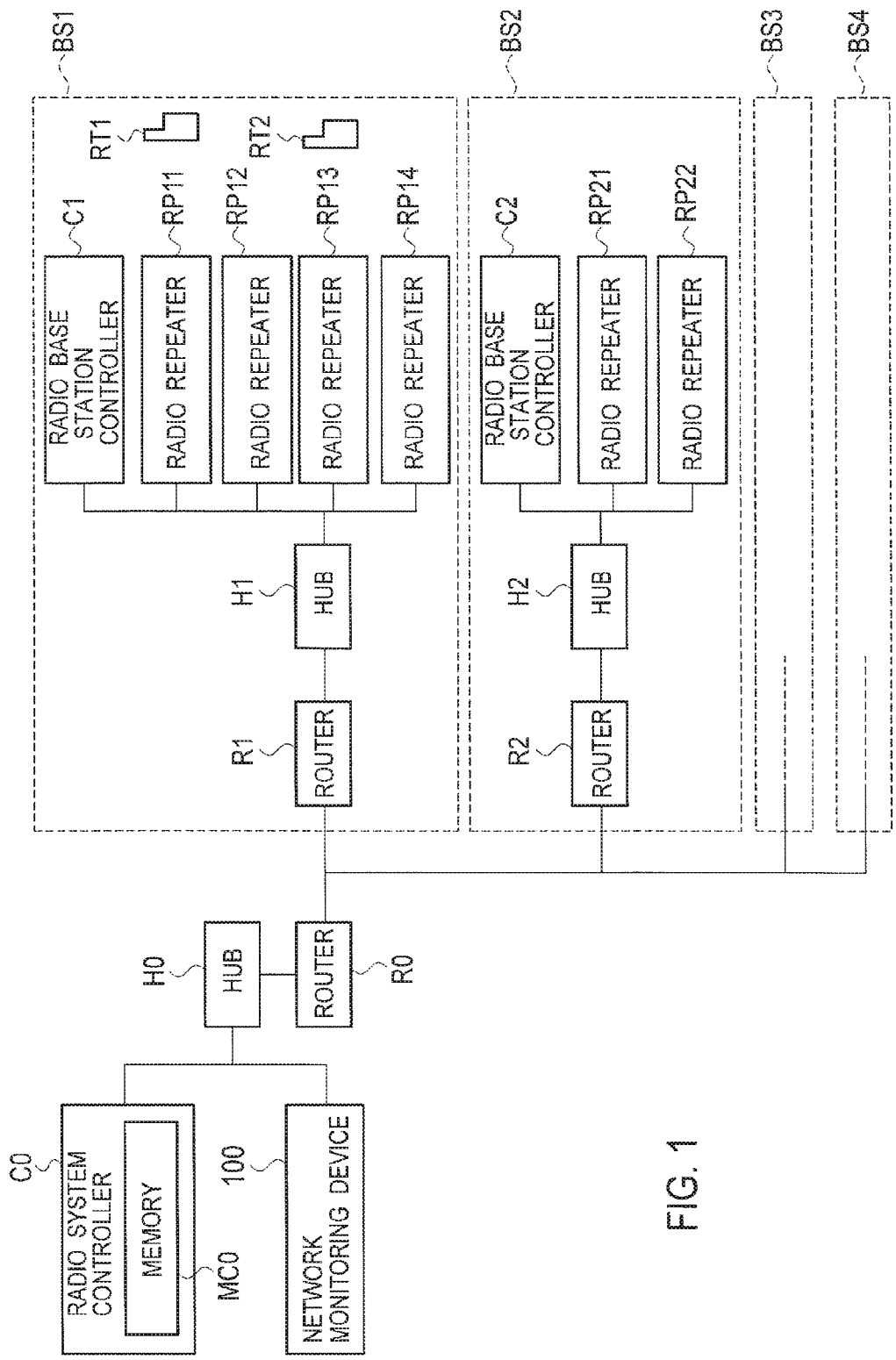
FIG. 1 is a block diagram showing a configuration example of a radio network system including an information display device according to the first embodiment.

The first embodiment uses a radio network system as an example. In FIG. 1, radio system controller C0 controls the whole of the radio network system. The radio system controller C0 includes memory MC0.

Network monitoring device 100 is connected to the radio system controller C0. Specific configuration and operation of the network monitoring device 100 will be described later in detail.

Radio base stations BS1 to BS4 are connected to the radio system controller C0 through hub H0 and router R0 in a parallel manner. The number of radio base stations is not limited to four.

The radio base station BS1 includes: router R1 and hub H1, and radio base station controller C1 and radio repeaters RP11 to RP14, which are connected to the hub H1 in the parallel manner. The number of radio repeaters is not limited to four. The radio base station controller C1 and one of the radio repeaters may be integrated with each other.

Radio terminals RT1 and RT2 transmit and receive a voice or data therebetween through the radio base station BS1. In actuality, a large number of the radio terminals are present in a communication area of the radio base station BS1.

The radio base station BS2 includes: router R2 and hub H2, and radio base station controller C2 and radio repeaters RP21 to RP22, which are connected to the hub H2 in the parallel manner. The number of radio repeaters is not limited to two. The radio base station controller C2 and one of the radio repeaters may be integrated with each other. One or a plurality of the radio terminals is also present in a communication area of the radio base station BS2.

Specific configurations of the radio base stations BS3 and BS4 are similar to that of the radio base station BS1 and BS2, and illustrations of the specific configurations are omitted. Each of the radio base stations BS3 and BS4 also includes a radio base station controller and one or a plurality of radio repeaters. Also, in the communication area of the radio base station BS3 or BS4, one or a plurality of radio terminals is present.

In the radio network system configured as described above, the radio base station controller C1 of the radio base station BS1 stores information regarding events which occur in the radio repeaters RP11 to RP14. The events here refer to those in which the radio repeaters RP11 to RP14 cause interferences and change to an inoperative state, and those errors occur due to a temperature rise, or the like. The interferences include the errors.

In a similar way, the radio base station controller C2 of the radio base station BS2 stores information regarding the events which occur in the radio repeaters RP21 or RP22. Each of the radio base station controllers of the radio base stations BS3 and BS4 stores information regarding the events which occur in the radio repeaters.

The radio system controller C0 collects all pieces of the information regarding the events which occur in the radio base stations BS1 to BS4, and stores the collected pieces of information in the memory MC0.

Figure 2:
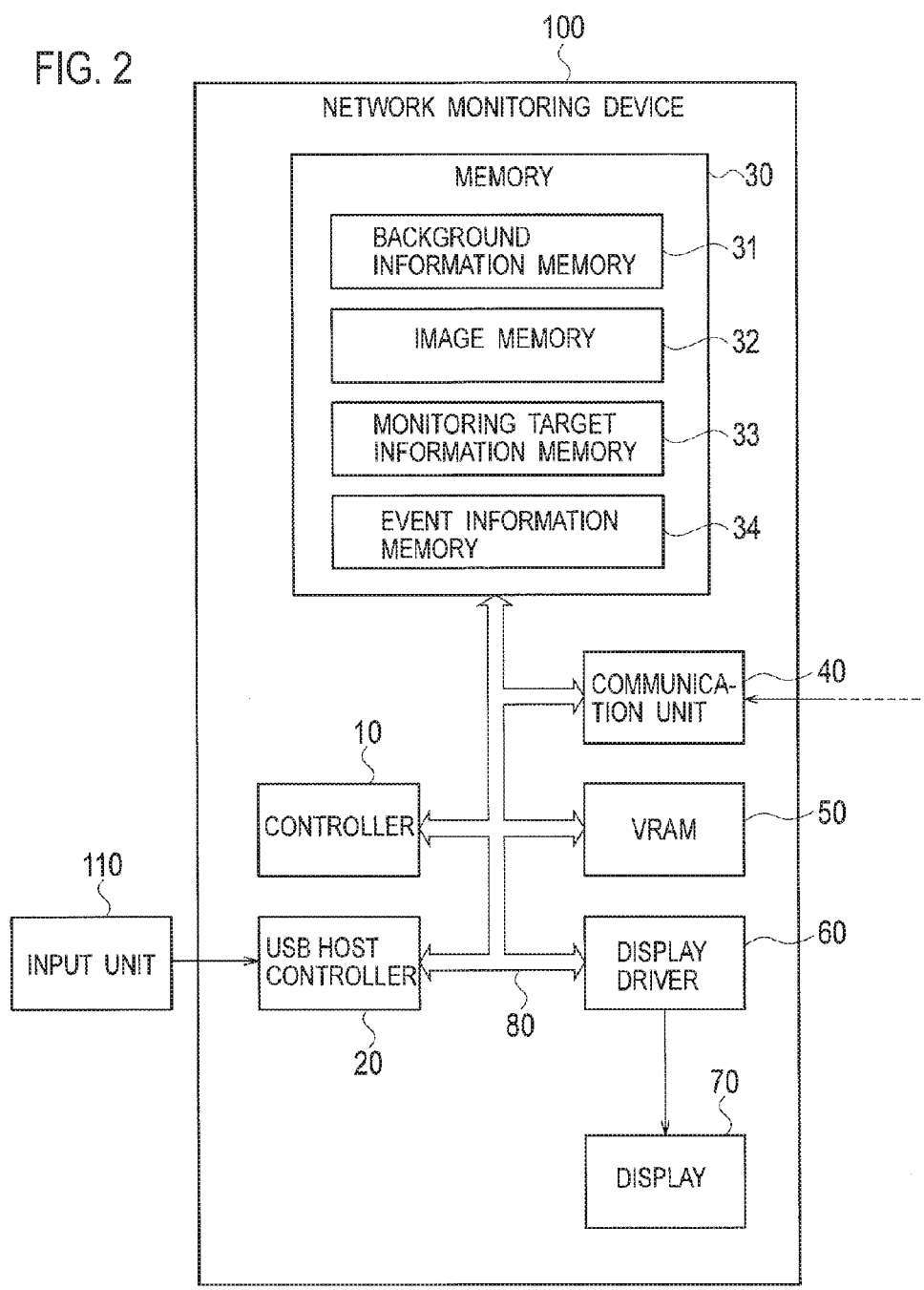
FIG. 2 is a block diagram showing a specific configuration example of a network monitoring device in FIG. 1 in the information display device according to the first embodiment.

By using FIG. 2, a description is made of the specific configuration and operation of the network monitoring device 100. The network monitoring device 100 includes: controller 10, USB host controller 20, memory 30, communication unit 40, VRAM 50, display driver 60, and display 70. The controller 10 controls the whole of the network monitoring device 100.

The controller 10, the USB host controller 20, the memory 30, the communication unit 40, a VRAM 50, and the display driver 60 are connected to one another by internal bus 80.

The display driver 60 and the display 70 may be provided outside of the network monitoring device 100. In the case where the display driver 60 and the display 70 are provided outside of the network monitoring device 100, the network monitoring device 100 just needs to have a function to supply the display driver 60 with information, which should be displayed on the display 70 by cable or radio.

The display driver 60 and the display 70 may be those provided in a portable terminal.

The memory 30 includes background information memory 31, image memory 32, monitoring target information memory 33, and event information memory 34. The background information memory 31 stores information (image) that becomes the background of a network topology diagram to be described later. The image memory 32 stores images which show monitoring targets displayed on the network topology diagram.

The monitoring target information memory 33 monitors information of the monitoring targets. The monitoring targets are the radio system controller C0, the hubs H0, H1, H2 . . . , the routers R0, R1, R2 . . . , the radio base station controllers C1, C2 . . . , and the radio repeaters RP11 to RP14, RP21, RP22 . . . in FIG. 1.

The monitoring target information memory 33 also stores position information regarding positions on the network topology diagram, on which the images stored in the image memory 32 showing the monitoring targets are to be displayed.

The information regarding the events stored in the memory MC0 of the radio system controller C0 is transferred to the network monitoring device 100. The event information memory 34 stores the transferred information regarding the events.

The controller 10 executes polling for each of the monitoring targets through the communication unit 40, and thereby monitors whether or not each of the monitoring targets operates normally. That is, the controller 10 executes live monitoring for each of the monitoring targets.

When a normal response is not obtained as a result of the polling, the controller 10 determines that interference (failure) occurs in the monitoring target, and stores the information regarding the event in the event information memory 34.

In such a way, the event information memory 34 stores the information regarding both of the events, the information which is collected by the radio system controller C0, and the information obtained as a result of the network monitoring device 100 that executes the live monitoring by itself.

Input unit 110 is connected to the USB host controller 20. The input unit 110 is, for example, a keyboard and a mouse. Any of the monitoring targets can be indicated by the input unit 110.

Figure 3:
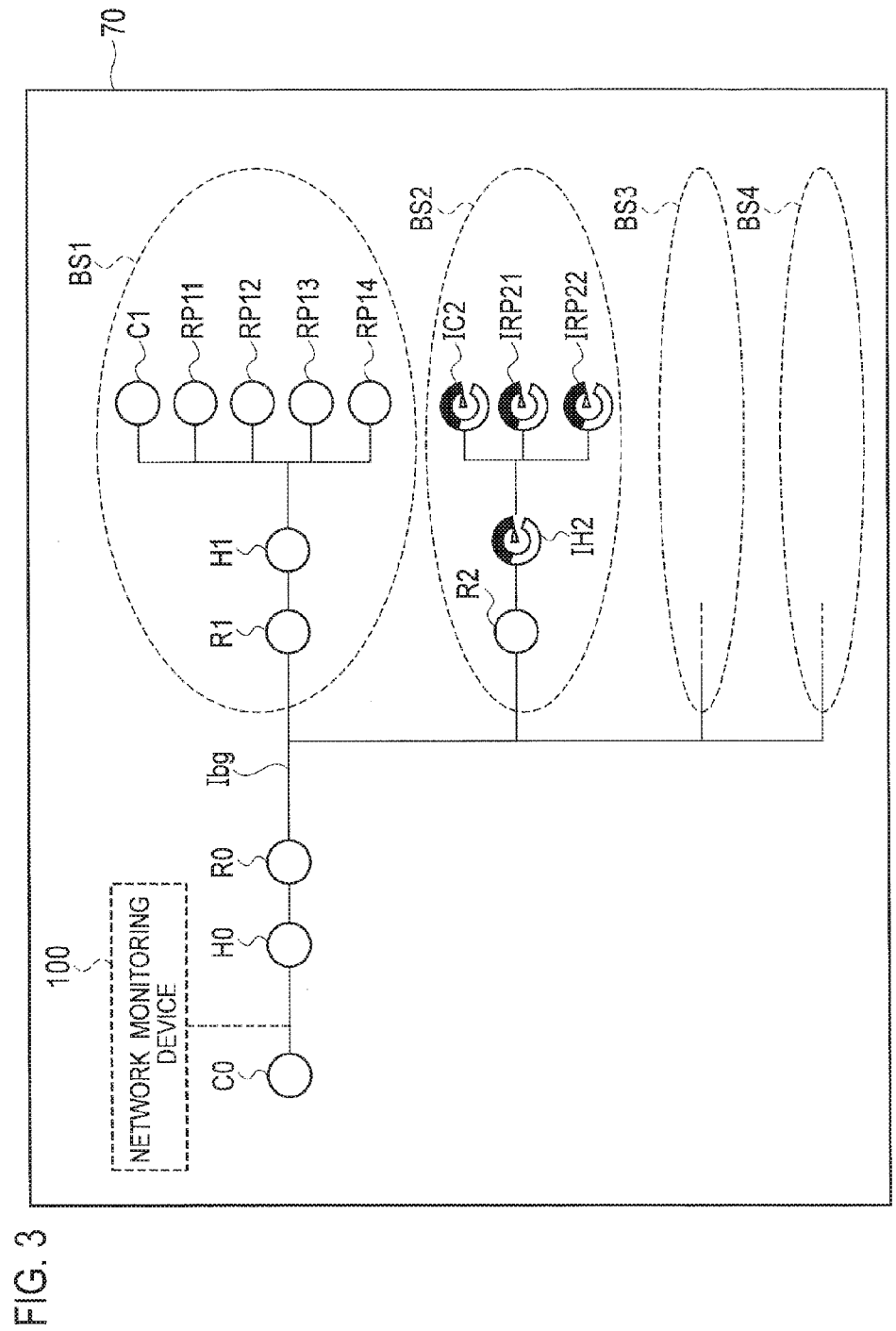
FIG. 3 is an example of a network topology diagram displayed on a display by the information display device, the information display method, and the information display program according to the first embodiment.

By using FIG. 3, a description is made of an example of the network topology diagram, which is displayed on the display 70 based on the control of the controller 10. As shown in FIG. 3, the radio system controller C0, the hubs H0, H1 . . . , the routers R0, R1, R2 . . . , the radio base station controller C1, and the radio repeaters RP11 to RP14, in FIG. 1, are schematically shown by circle images.

The circle images are examples of predetermined images which indicate the monitoring targets, and are stored in the image memory 32. A background image Ibg shows the connection state of the monitoring targets, and is stored in the background information memory 31. On the network topology diagram, the network monitoring device 100 shown as a broken line may be displayed, or does not have to be displayed.

The controller 10 draws the background image Ibg, which is stored in the background information memory 31 in the VRAM 50. Moreover, the controller 10 draws the circle image, which is stored in the image memory 32 to the position of each of the monitoring targets in the VRAM 50. The controller 10 functions as the drawing controller.

In the example shown in FIG. 3, in the radio base station BS2, the events such as the interferences occur in the hub H2, the radio base station controller C2, and the radio repeaters RP21 and RP22. Due to the occurrence of the events such as the interferences, not the circle images, but the event display images IH2, IC2, IRP21, and IRP22 are displayed on the positions of the respective monitoring targets. Note that, in this example, the hub H2 is a highly functional hub that is imparted with an IP address and can make a response as a network instrument.

The controller 10 draws the event display images onto the VRAM 50, which are stored in the image memory 32 on the positions of the monitoring targets, where the events occur, and displays the drawn event display images on the display 70.

Here, the network monitoring device 100 displays the event display images on the positions of the monitoring targets, and where the events occur. The network monitoring device 100 may display the event display images on positions of the monitoring targets, where the events occurred in the past, on positions of the monitoring targets, and where the events are scheduled to occur in the future.

By using FIGS. 4A to 4D and FIGS. 5A to 5E, a description is made of examples of the event display images. The event display images displayed in place of the circle images indicating the monitoring targets at the time when the events occur are generically referred to as an event display image Ievent.

Figure 4A:
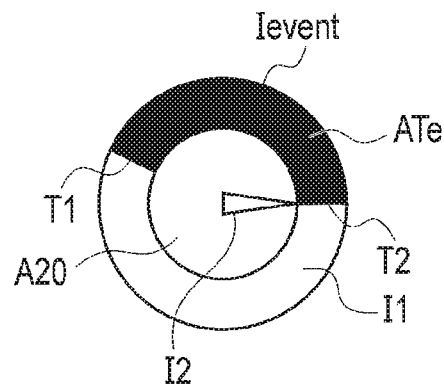
FIGS. 4A to 4D are views showing examples of event display images for use in information display devices, information display methods, and information display programs according to the respective embodiments.

The event display image Ievent shown in FIG. 4A includes annular portion I1 and time display indicator I2. An entire circumference of the annular portion I1 represents 12 hours. The time display indicator I2 corresponds to an hour hand of an analog watch. In place of the annular portion I1, a circular portion that is a simple circle may be used. The circular portion includes the annular portion.

A position of an annular portion I1-side tip end of the time display indicator I2 indicates the current xx o'clock in which yy minutes in the current time that is yy minutes past xx o'clock are omitted. It is defined that the current time is 15 o'clock (three o'clock in the afternoon).

In the example shown in FIG. 4A, in the annular portion I1, a region from time T1 corresponding to 10 o'clock to time T2 corresponding to 15 o'clock is painted over. Such a region ATe thus painted over becomes an event occurrence time display portion indicating an occurrence time of the event. That is, the region ATe of the event display image Ievent shown in FIG. 4A represents that the event occurred at 10 o'clock and is continuing to the current time.

The image memory 32 stores images which individually show the annular portion I1 and the time display indicator I2. The controller 10 reads the images, which individually show the annular portion I1 and the time display indicator I2 from the image memory 32, and draws the read images onto the VRAM 50. The controller 10 draws the image, which indicates the time display indicator I2, while rotating the image in response to the current time at the time of drawing the image onto the VRAM 50.

The controller 10 forms the region ATe on the annular portion I1 based on the information regarding the event stored in the event information memory 34, and can thereby generate the event display image Ievent shown in FIG. 4A.

Here, the region ATe is defined by painting over the region of the occurrence time of the event in the annular portion I1; however, the region ATe may be displayed by a predetermined color, or the region ATe may be shaded by a predetermined pattern, and so on. The display mode of the region ATe that is an event occurrence time display portion is not limited to the painting over.

In order to cause effective visual recognition that the event occurs, region A20 inside of the annular portion I1 may blink. Such an inside region may blink only in a case where there is an event continuing to the current time. Moreover, the inside region may blink in cases such as where there is no event continuing to the current time and all of the events which occurred are solved (ended). The controller 10 changes the drawing state in the VRAM 50 appropriately, and can thereby blink a predetermined region.

Figure 4B:
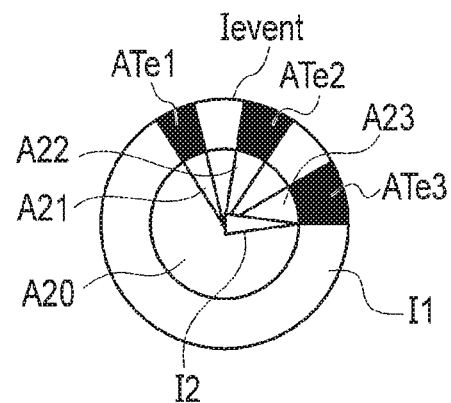

The event display image Ievent shown in FIG. 4B, has three regions which are painted over: ATe1, ATe2 and ATe3. In such a way, the event display image Ievent shows that two events occurred in the past, and that an event that occurred for the third time is continuing to the current time. In the event display image Ievent shown in FIG. 4B, fan-like portions A21, A22, and A23, which correspond to the regions ATe1, ATe2, and ATe3, respectively, may blink.

Figure 4C:
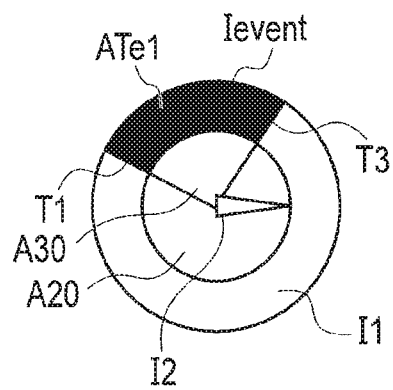

An annular portion I1 of the event display image Ievent shown in FIG. 4C, has a region ATe painted over from the time T1 corresponding to 10 o'clock to the time T2 corresponding to 13 o'clock. That is, the region ATe of the event display image Ievent shown in FIG. 4C shows that the event occurred at 10 o'clock, and that the event was solved at 13 o'clock.

Also in FIG. 4C, a region A20 in the inside of the annular portion I1 or a fan-like portion A30 corresponding to the region ATe may blink. The event display image Ievent shown in FIG. 4C shows an event that occurred in the past, and accordingly, the region A20 or the fan-like portion A30 does not need to blink.

Figure 4D:
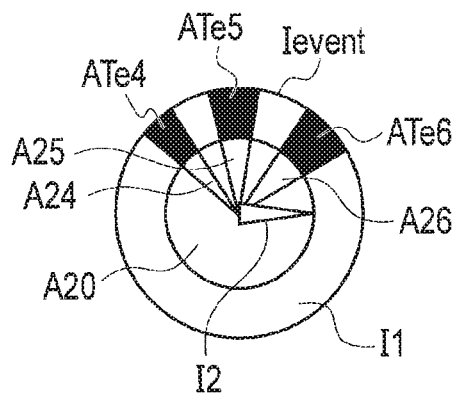

The event display image Ievent shown in FIG. 4D has three regions in the past: ATe4, ATe5, and ATe6. In such a way, the event display image Ievent shows that three events occurred in the past and have already been solved.

In a similar way to the above, fan-like portions A24, A25, and A26 corresponding to the regions ATe4, ATe5, and ATe6 may blink or do not need to blink.

In accordance with the event display images Ievent shown in FIG. 4A to FIG. 4D, it is difficult to distinguish the past and the future from each other. FIG. 5 shows examples of event display images Ievent modified so as to distinguish the past and the future from each other.

Figure 5A:
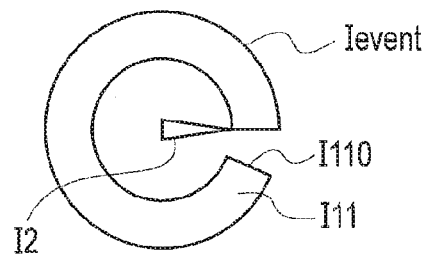
FIGS. 5A to 5E are views showing other examples of the event display images for use in the information display devices, information display methods, and information display programs according to the respective embodiments.

The event display image Ievent shown in FIG. 5A includes: an annular portion I111 having gap portion I1110 that is a partial cutoff, and the time display indicator I2. If the gap portion I1110 is defined to have a length of 1 hour, then the annular portion I111 indicates 11 hours. Only the annular portion I111 may indicate 12 hours. The gap portion I1110 may have a length of approximately 30 minutes.

Figure 5B:
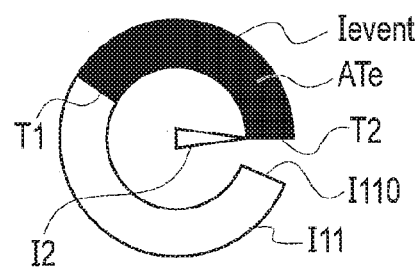

The example shown in FIG. 5B has region ATe painted over from the time T1 corresponding to 10 o'clock to the time T2 corresponding to 15 o'clock. The region ATe of the event display image Ievent shown in FIG. 5B, represents that the event occurred at 10 o'clock and is continuing to the present.

The event display images IH2, IC2, IRP21, and IRP22 shown on the positions of the hub H2, the radio base station controller C2, and the radio repeaters RP21 and RP22 in FIG. 3 are the event display images Ievent shown in FIG. 5B.

Figure 5C:
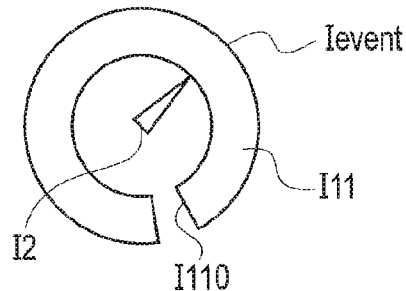

In the event display image Ievent shown in FIG. 5C, the annular portion I11 continues over the future from the current time indicated by the time display indicator I2. That is, the event display image Ievent shown in FIG. 5C is capable of displaying the events in the past and the future with respect to the current time.

Figure 5D:
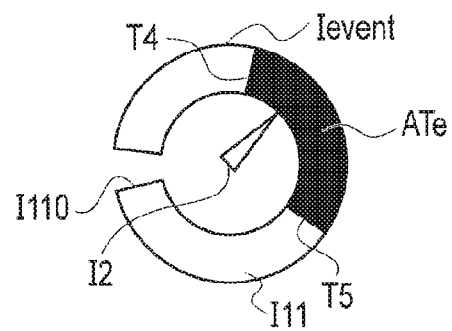

The example shown in FIG. 5D has region ATe painted over from time T4 to time T5. The region ATe of the event display image Ievent shown in FIG. 5D represents that the event occurred at the time T4, is continuing over the current time, and will be solved at the time T5.

Figure 5E:
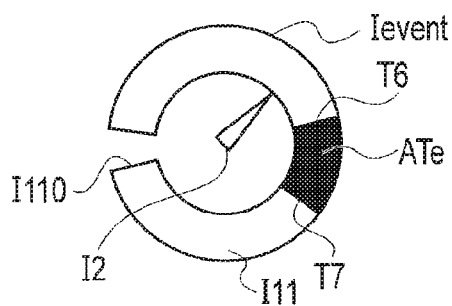

The example shown in FIG. 5E has region ATe painted over from time T6 to time T7. The region ATe of the event display image Ievent shown in FIG. 5E, represents that the event is scheduled to occur for a future period from the time T6 to the time T7.

The event display images Ievent as shown in FIG. 5C to FIG. 5E, which are capable of displaying the future events, are useful, for example, in the case where the monitoring targets turn to the inoperative state due to a check, a repair or the like, and the time when the operations resume is predetermined.

As described above as an example, the annular portion I1 or I11 of the event display image Ievent indicates a predetermined time (for example, 12 hours) before the current time. The event occurrence time display portion expressed by the region ATe indicates, in the event that occurred in the past, the time from the occurrence time of the event to the solution time of the event, and in the event that is continuing at the current time, the time from the occurrence time of the event to the current time.

As another example, the annular portion I1 or I11 of the event display image Ievent may indicate the predetermined time including the past and the future while sandwiching the current time therebetween.

The event occurrence time display portion indicates, in an event that occurred in the past, the time from the occurrence time of the event to the solution time of the event, and in the event that is continuing at the current time, the time from the occurrence time of the event to the current time.

Moreover, in an event that occurred in the past and will be solved in the future, the event occurrence time display portion indicates the time from the occurrence time of the event to such a solution-scheduled time thereof, and in an event that is scheduled to occur in the future, the event occurrence time display portion indicates the time from such an occurrence-scheduled time of the event to the solution-scheduled time thereof.

Figure 6:
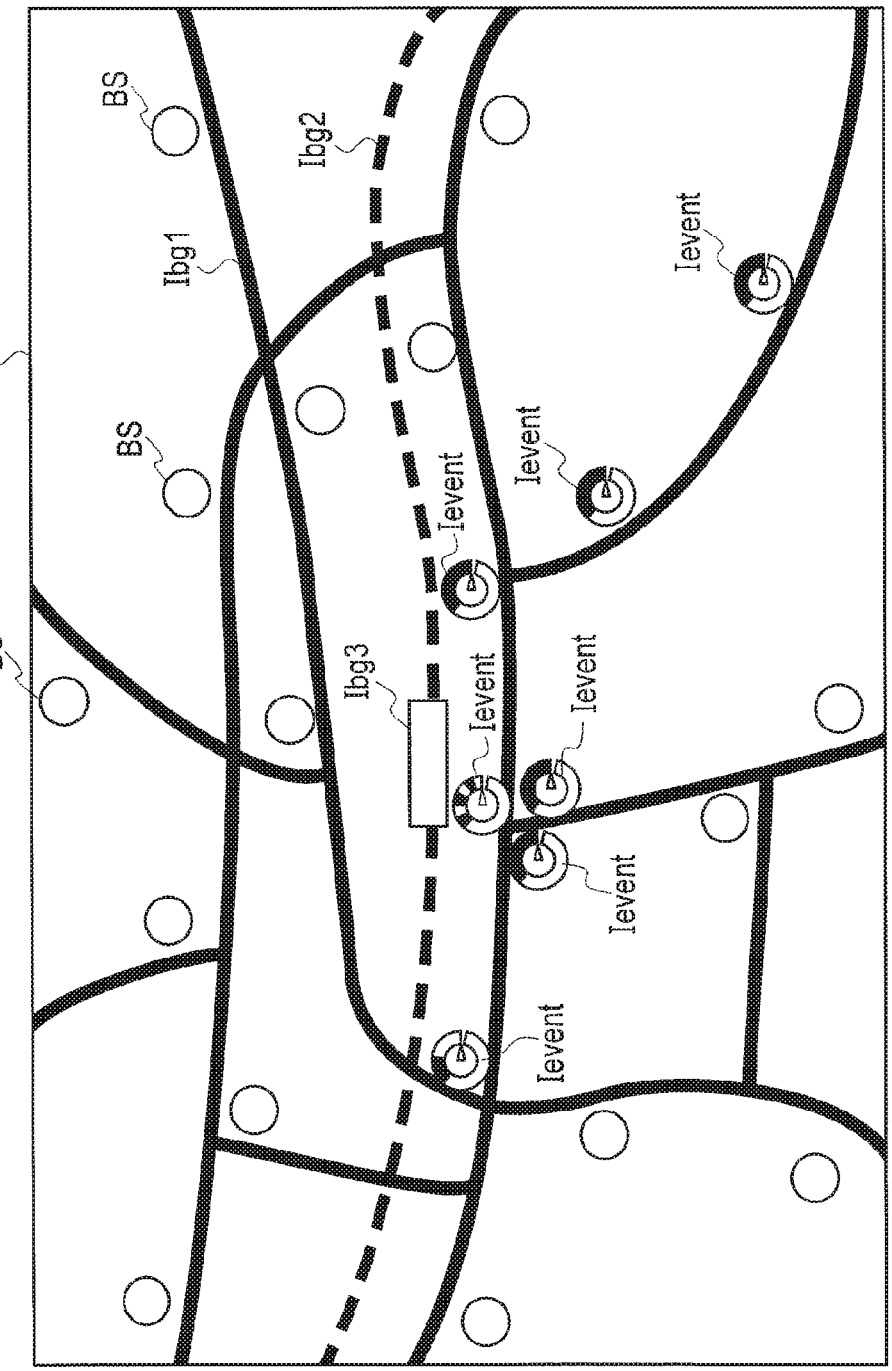
FIG. 6 is an example of a map which indicates positions of radio base stations, and is displayed on the display by the information display device, the information display method, and information display program according to the first embodiment.

A display mode shown in FIG. 6 is an example of showing places where the radio base stations are located on a map, and of displaying the radio base stations where the interferences are occurring (or have occurred) by the event display images Ievent of FIG. 4 or FIG. 5.

By the network monitoring device 100 shown in FIG. 2, it is also possible to display the display mode, which is shown in FIG. 6 on the display 70. The background information memory 31 stores, as background images, image Ibg1 showing a road, image ibg2 showing a railway, image Ibg3 showing a station, or the like, each of which compose the map.

Circle images disposed on the map show the radio base stations BS. The radio base stations BS are arbitrary radio base stations, including the radio base stations BS1 to BS4. The image memory 32 stores the circle images showing the radio base stations BS. The monitoring target information memory 33 stores position information regarding the positions on the map, on which the respective radio base stations BS are to be displayed.

In a part of the radio base stations BS, the interferences occurred in the past, or the interferences are occurring at present. Not the circle images but the event display images Ievent are displayed on the positions of the radio base stations BS where the interferences are occurring (or have occurred).

Figure 7:
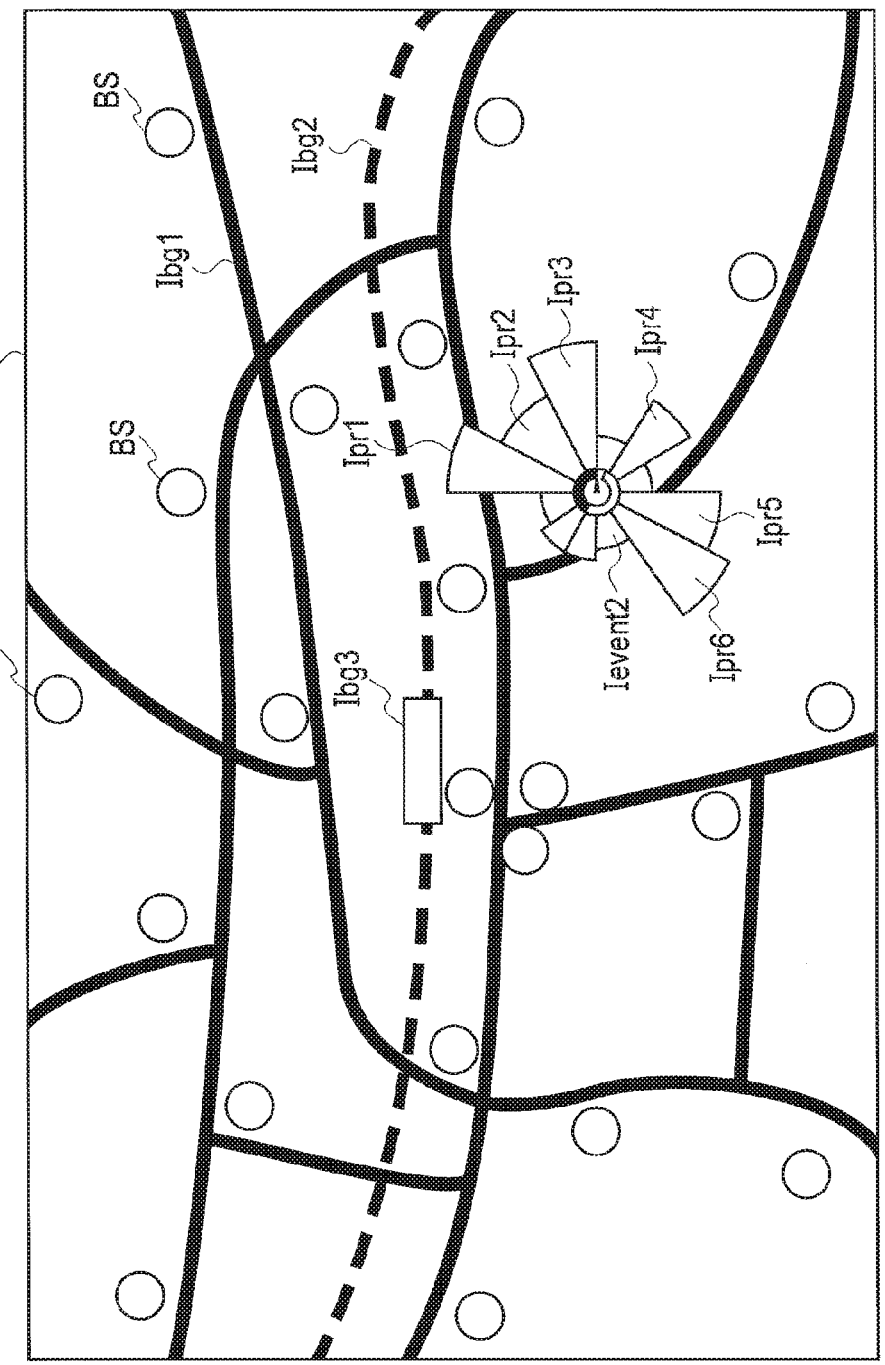
FIG. 7 is an example of a map indicating a modification example of the event display image displayed on the position of the radio base station.

FIG. 7 is an example of displaying a modification example of the event display image Ievent on the map. Event display image Ievent2 shown in FIG. 7 is one in which additional information is added to a periphery of the event display image Ievent. In the example shown in FIG. 7, the additional information is expressed by fan-like protruding portions.

For example, the fan-like protruding portions represent information such as follows. The protruding portion Ipr1 represents the number of terminals in the radio base station BS. The protruding amount of the protruding portion Ipr1 is increased as the number of terminals is larger, whereby the number of terminals can be broadly recognized.

The protruding portion Ipr2 represents the number of channels of the radio base station BS. The protruding amount of the protruding portion Ipr2 is increased as the number of channels is larger, whereby the number of channels can be broadly recognized.

The protruding portion Ipr3 represents a channel utilization ratio of the radio base station BS. A protruding amount of the protruding portion Ipr3 is increased as the channel utilization ratio is larger, whereby the channel utilization ratio can be broadly recognized.

The protruding portion Ipr4 represents the number of unmade calls in a communication in the radio base station BS. A protruding amount of the protruding portion Ipr4 is increased as the number of unmade calls is larger, whereby the number of unmade calls can be recognized broadly.

The protruding portion Ipr5 represents a delay time of each of the made calls in the communication in the radio base station BS. A protruding amount of the protruding portion Ipr5 is increased as the delay time is longer, whereby the delay time can be recognized broadly.

The protruding portion Ipr6 represents a board temperature of the radio base station BS. A protruding amount of the protruding portion Ipr6 is increased as the board temperature is higher, whereby the board temperature can be recognized broadly.

Incidentally, the network monitoring device 100 shown in FIG. 2 can be composed by using a personal computer. A computer program (information display program) can cause a computer to execute operations similar to those in the information display device and information display method of the first embodiment.

In accordance with the information display device, information display method, and information display program according to the first embodiment, the temporal information of the events regarding the monitoring targets can be intuitively recognized. In the information display device, information display method, and information display program according to the first embodiment, the monitoring targets are the instruments which compose the radio network system, and the events are the interferences or the failures, which occur in the instruments.

Second Embodiment

The second embodiment uses a road traffic information display device as an example. In a road traffic information display device 200 shown in FIG. 8, the same reference numerals are assigned to substantially the same portions as those of the network monitoring device 100 shown in FIG. 2, and a description thereof may be omitted.

Figure 8:
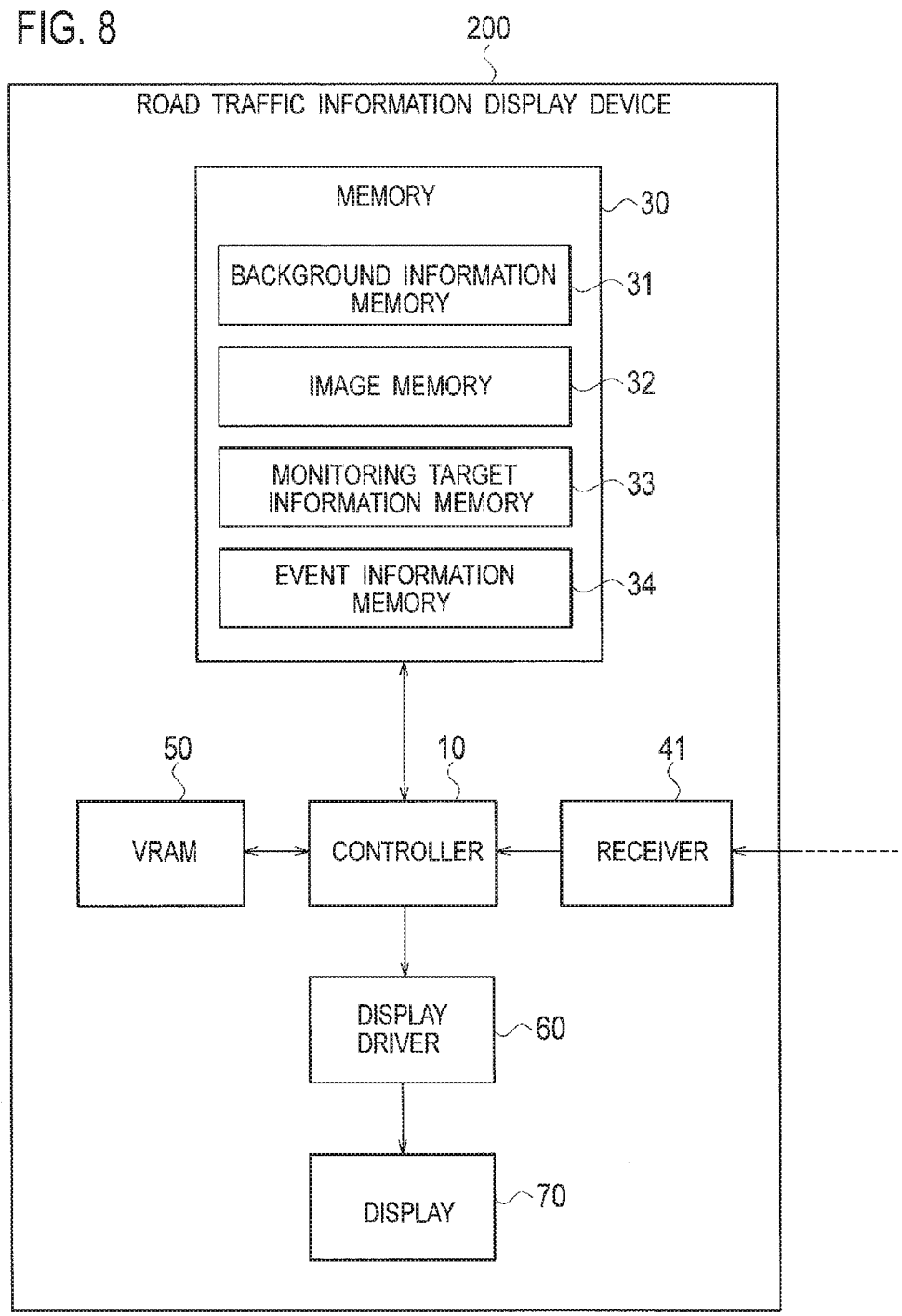
FIG. 8 is a block diagram showing a configuration example of a road traffic information display device, including an information display device according to the second embodiment.
Figure 9:
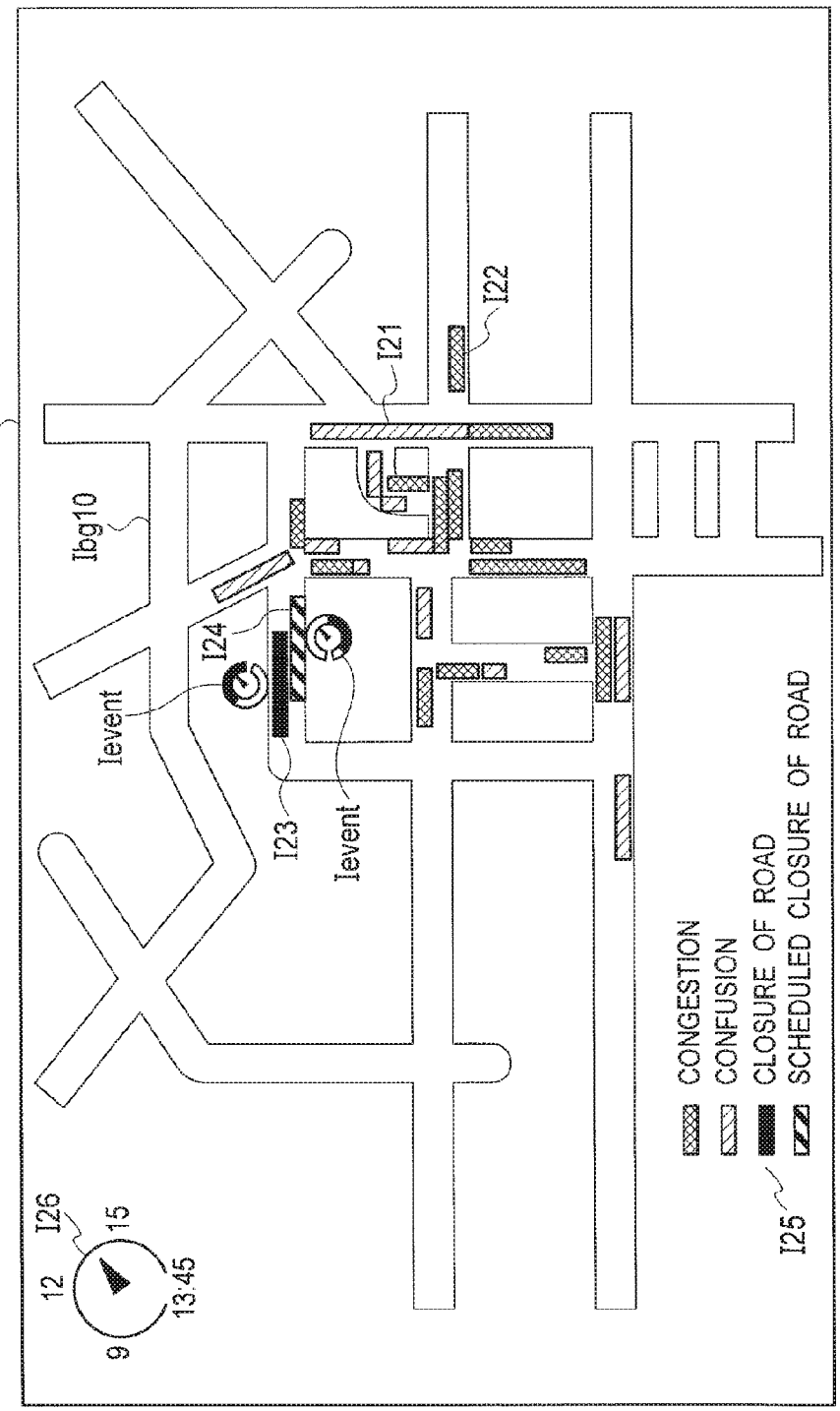
FIG. 9 is a view showing an example of road traffic information displayed on the display by the information display device, the information display method, and the information display program according to the second embodiment.

In FIG. 8, background information memory 31 stores image Ibg10 showing a road on a map shown in FIG. 9. Image memory 32 stores event display image Ievent, image I21 showing congestion, image I22 showing confusion, image I23 showing closure of the road, image I24 showing a scheduled closure of the road, image I25 showing legends, and supplemental image I26, all of which are shown in FIG. 9.

The supplemental image I26 is information for supplementing the event display image Ievent showing the closure of the road. "13:45" on the supplemental image I26 indicates the current time. The image memory 32 stores an image other than the current time. It is possible to omit the supplemental image I26.

A monitoring target information memory 33 stores information regarding the respective roads which are the monitoring targets. The event information memory 34 stores information regarding the congestion, the confusion, the closure of the road, and the scheduled closure of the road as events in regards to the roads.

Receiver 41 receives event information regarding the roads, which is provided from a road traffic information providing center (not shown). The controller 10 stores the received information regarding the roads in the event information memory 34.

In a similar way to FIG. 2, the controller 10 draws a variety of images into the VRAM 50, and thereby generates such a map image as shown in FIG. 9. The controller 10 displays the map image on the display 70.

As shown in FIG. 9, the controller 10 displays the event display image Ievent so that the event display image Ievent is adjacent to the closed road. Moreover, the controller 10 displays the event display image Ievent so that the event display image Ievent is adjacent to the road scheduled to be closed. As described above, the controller 10 displays the information regarding passage of the roads by using the event display images Ievent.

In accordance with the information display device, the information display method, and information display program according to the second embodiment, the temporal information of the events regarding the monitoring target can be intuitively recognized. In the information display device, information display method, and information display program according to the second embodiment, the monitoring targets are the roads, and the events are the information regarding the passage of the roads. The information regarding the passage of the roads may be information as to whether or not it is possible to pass through the roads.

Third Embodiment

The third embodiment uses a navigation device as an example. In navigation device 300 shown in FIG. 10, the same reference numerals are assigned to substantially the same portions as those of the network monitoring device 100 shown in FIG. 2, and a description thereof may be omitted.

Figure 10:
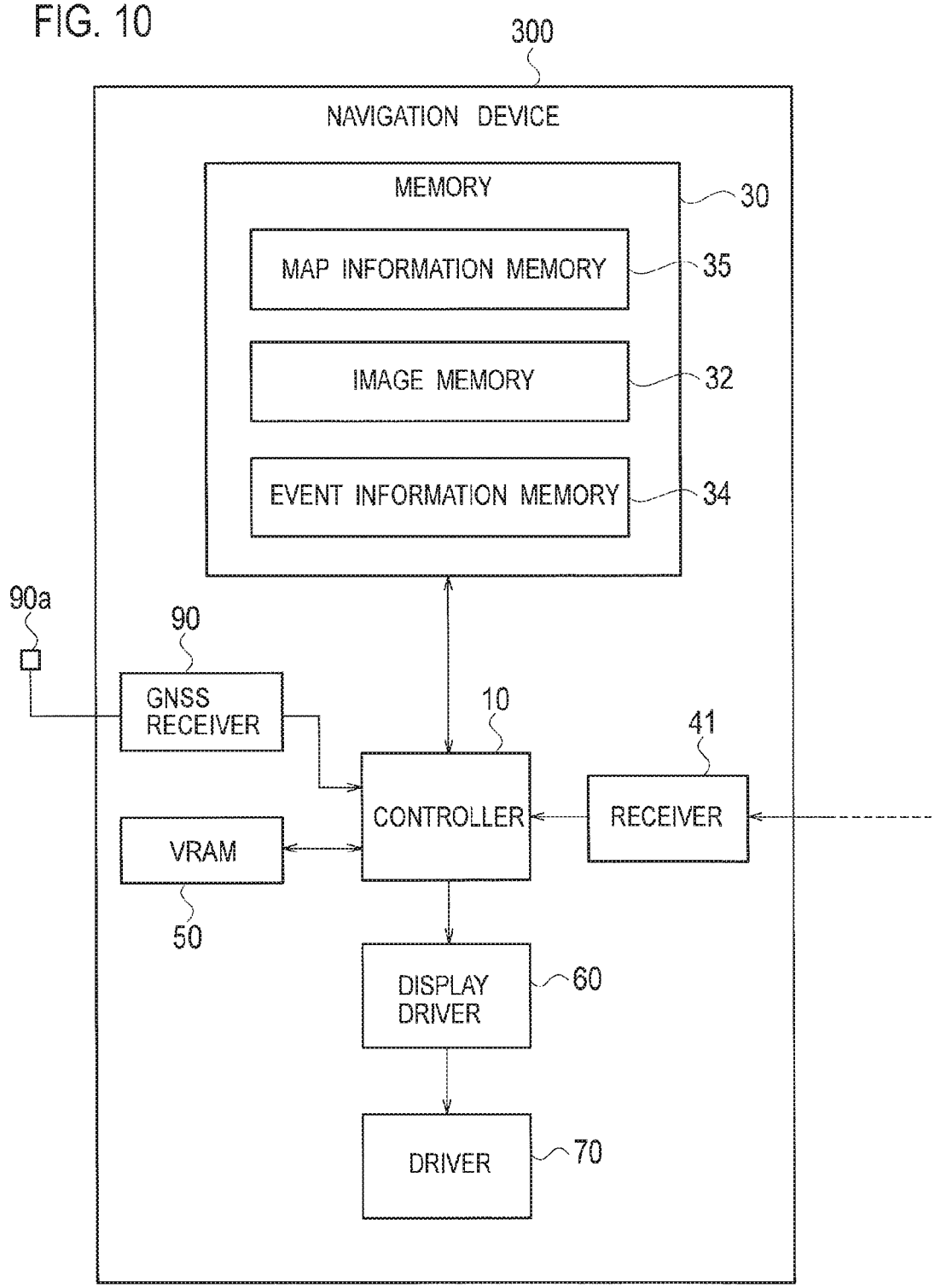
FIG. 10 is a block diagram showing a configuration example of a navigation device, including the information display device according to the second embodiment.

In FIG. 10, map information memory 35 stores map information. Image memory 32 stores event display images Ievent. Receiver 41 receives traffic information to be received from an FM multiplex broadcast or transmitters on roads.

The traffic information includes information regarding passage of the roads as the event regarding the roads. The event regarding the roads is at least the closure of the road. In the similar way to the second embodiment, the event regarding the roads may be the congestion, the confusion, the closure of the road, and the scheduled closure of the road. The controller 10 stores the received information of the event in the event information memory 34.

The traffic information may be traffic information called VICS (Vehicle Information and Communication System). VICS is a registered trademark of Vehicle Information and Communication System Center in Japan.

Antenna 90a receives radio waves from a plurality of satellites for Global Navigation Satellite System (GNSS).

GNSS receiver 90 receives GNSS signals outputted from the antenna 90a. An example of the GNSS is GPS (Global Positioning System).

The GNSS receiver 90 receives the GNSS signals which are based on the radio waves from a plurality of satellites, whereby the controller 10 detects and stores a current position of the navigation device 300.

In the navigation device 300, position information is changed following movement of a vehicle that mounts the navigation device 300 thereon. The controller 10 acquires position information for displaying a plurality of respective monitoring targets on a general view.

The controller 10 reads map information on a periphery of the current position from the map information memory 35, and draws the read map information into the VRAM 50. The controller 10 draws the event display image Ievent on the map.

A map image displayed on a display 70 of the navigation device 300 is similar to that of FIG. 9. However, the map image is changed following the movement of the vehicle.

The event display images Ievent in the first to third embodiments described above may be developed as shown in FIG. 11 while being each taken as a base.

Figure 11:
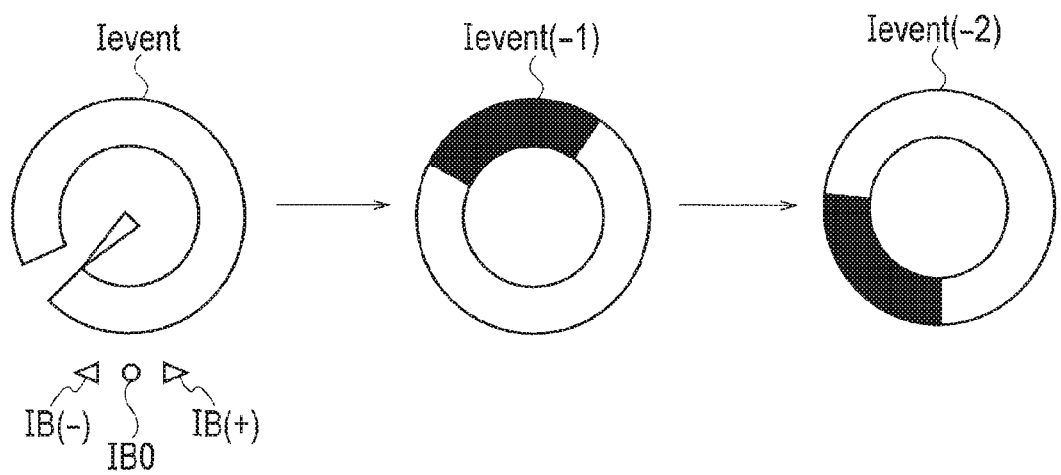
FIG. 11 is a view showing an example of the transition of the event display image.

As shown in FIG. 11, below the event display image Ievent, there are displayed: time return button IB(−); time advance button IB(+); and current time return button IB0 to return the time to the current time that is an initial state.

In the example of FIG. 2, when the time return button IB(−) is operated by the input unit 110, the controller 10 shifts the event display image Ievent, for example, to an event display image Ievent(−1) 12 hours before. Subsequently, when the time return button IB(−) is depressed, the controller 10 further shifts the event display image Ievent(−1) to the event display image Ievent(−2) 12 hours before.

As shown in FIG. 11, the event display image Ievent is shifted to the event display image Ievent(−1), and the event display image Ievent(−1) is shifted to the event display image Ievent(−2), whereby the events which occurred in the past can be recognized.

In the case where the events which will occur in the future are turned out in advance, the time advance button IB(+) is operated in a similar way, whereby the events which are scheduled to occur in the future can be recognized.

The annular portion I1 or I11 of each of the event display images Ievent described above indicates 12 hours (or 11 hours). As a modification example of the event display image Ievent, the annular portion may be defined to indicate 1 hour, and events which occurred within 1 hour may be displayed.

Figure 12:
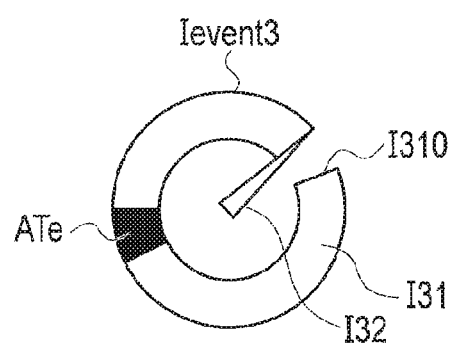
FIG. 12 is a view showing a modification example of the event display image.

Event display image Ievent3 shown in FIG. 12 includes annular portion I31 and minute display indicator I32. The annular portion I31, which indicates gap portion I310, indicates 1 hour. The minute display indicator I32 corresponds to a minute hand of an analog watch.

In accordance with the event display image Ievent3, it is possible to display the events which occurred within 1 hour, in detail.

The information display devices and information display methods of the first to third embodiments are summarized as follows.

The event information memory 34 stores the occurrence time of the event so as to cause the occurrence time of the event to correspond to each of the monitoring targets in which the events occurred or the monitoring targets in which the events are scheduled to occur among a plurality of monitoring targets.

Based on the position information for displaying each of a plurality of monitoring targets on the general view, the controller 10 instructs control to draw the event display image (Ievent, Ievent2, or Ievent3) on the general view so as to cause the event display image to correspond to the monitoring target stored in the event information memory 34. The controller 10 functions as a drawing controller.

In the first and second embodiments, the monitoring target information memory 33 stores the position information for displaying each of a plurality of monitoring targets on the general view. Based on the position information stored in the monitoring target information memory 33, the controller draws the event display image (Ievent, Ievent2, or Ievent3) on the general view.

In the third embodiment, the controller 10 acquires the position information of the current position. Based on the position information of the current position, the controller draws the event display image (Ievent, Ievent2, or Ievent3) on the general view.

The drawing controller draws the circular portion indicating the predetermined time in the circumferential direction, the indicator (time display indicator I2 or minute display indicator I32) indicating the current hour or minute, and the event occurrence time display portion, which is displayed on the circular portion and is caused to correspond to the occurrence time of the event as the event display image (Ievent, Ievent2, or Ievent3). An example of the circular portion is the annular portion I1 or I11. The region ATe, ATe1, ATe2, ATe3, ATe4, ATe5, or ATe6 corresponds to the event occurrence time display portion.

The information display programs according to the first to third embodiments are summarized as follows. The event information memory 34 stores the occurrence time of the event, which corresponds to each of the monitoring targets in which the events occurred or the monitoring targets in which the events are scheduled to occur among a plurality of monitoring targets.

It is recommended that the information display program causes the computer to execute a step of writing the occurrence time of the event into the event information memory 34.

The information display program causes the computer to execute a readout step of reading from the event information memory 34, the occurrence time of the event which corresponds to each of the monitoring targets in which the events occurred, and the monitoring targets in which the events are scheduled to occur.

The information display program causes the computer to execute a drawing step of drawing the event display images on the general view based on the position information for displaying each of a plurality of monitoring targets on the general view. The information display program causes the computer to draw the event display images so as to cause the event display images to correspond to the monitoring targets in which the events occurred, or the monitoring targets in which the events are scheduled to occur, the events being read from the event information memory 34.

In the first and second embodiments, the monitoring target information memory 33 stores in advance the position information for displaying each of a plurality of monitoring targets on the general view. In the third embodiment, the controller 10 acquires the position information of the current position in order to display each of a plurality of monitoring targets on the general view.

It is recommended that the information display program causes the computer to execute a readout step of reading the position information from the monitoring target information memory 33. It is recommended that the information display program cause the computer to use the position information of the current position, which is acquired by the controller 10.

The information display program causes the computer to execute a drawing step of drawing the event display image (Ievent, Ievent2, or Ievent3) on the general view so as to cause the event display images to correspond to the monitoring target in which the event occurred, or the monitoring target in which the event is scheduled to occur, the events being read from the event information memory 34.

The information display program causes the computer to draw the event display image (Ievent, Ievent2, or Ievent3) on the general view based on the position information for displaying each of a plurality of monitoring targets on the general view.

The event display image (Ievent, Ievent2, or Ievent3), which the information display program causes the computer to draw in the drawing step, is an image including: the circular portion indicating the predetermined time in the circumferential direction, the indicator (time display indicator I2 or minute display indicator I32) indicating the current hour or minute, and the event occurrence time display portion caused to correspond to the occurrence time of the event.

The general view is, for example, the network topology diagram, the system distribution diagram, and the map.

The information display program may be a computer program recorded in a computer readable storage medium. The information display program may be provided in a state of being stored in the recording medium, or may be provided through a network such as the Internet so as to be downloaded to the computer. The computer-readable storage medium may be an arbitrary and non-transitory storage medium such as a CD-ROM or a DVD-ROM.

The present invention is not limited to the first to third embodiments described above, and is changeable in various ways within the scope without departing from the scope of the present invention.

What is claimed is:

1. An information display device comprising:
an event information memory configured to store an occurrence time of an event, so as to cause the occurrence time of the event to correspond to each of monitoring targets in which the events occurred, or monitoring targets in which the events are scheduled to occur among a plurality of the monitoring targets; and
a drawing controller configured to instruct control to draw an event display image on a general view, based on position information for displaying each of a plurality of monitoring targets on the general view, so as to cause the event display image to correspond to the monitoring target stored in the event information memory, wherein the drawing controller draws, as the event display image:
a circular portion indicating a predetermined time in a circumferential direction;
an indicator indicating a current hour or minute; and
an event occurrence time display portion displayed on the circular portion and caused to correspond to the occurrence time of the event, and wherein
the circular portion indicates the predetermined time before a current time, and
the event occurrence time display portion indicates, in an event that occurred in the past, a time from the occurrence time of the event to a solution time of the event, and in an event that is continuing at the current time, a time from the occurrence time of the event to the current time.

2. The information display device according to claim 1, wherein:
the predetermined time indicated by the circular portion comprises the current time and past times, and
the circular portion comprises a gap portion between the current time and a most past time included in the predetermined time indicated by the circular portion.

3. The information display device according to claim 1, wherein the circular portion indicates the predetermined time including the past and a future while sandwiching the current time therebetween, and the event occurrence time display portion indicates a time from the occurrence time of the event to a solution time of the event in an event that occurred in the past, a time from the occurrence time of the event to the current time in an event that is continuing at the current time, a time from the occurrence time of the event to a solution-scheduled time of the event in an event that occurred in the past and will be solved in the future, and a time from an occurrence-scheduled time of the event to the solution-scheduled time of the event in an event that will occur in the future.

4. The information display device according to claim 3, wherein
the predetermined time indicated by the circular portion comprises the current time, past times, and future times, and
the circular portion comprises a gap portion between a most past time and a most future time indicated by the circular portion.

5. The information display device according to claim 1, wherein the circular portion is an annular portion, and the event occurrence time display portion is displayed in the annular portion.

6. The information display device according to claim 1, further comprising a monitoring target information memory configured to store the position information for displaying each of a plurality of monitoring targets on the general view, wherein, based on the position information stored in the monitoring target information memory, the drawing controller draws the event display image so as to cause the event display image to correspond to the monitoring target in which the event occurred, or the monitoring target in which the event is scheduled to occur.

7. An information display method comprising:
storing an occurrence time of an event so as to cause the occurrence time of the event to correspond to each of monitoring targets in which the events occurred, or monitoring targets in which the events are scheduled to occur among a plurality of the monitoring targets; and
based on position information for displaying each of a plurality of the monitoring targets on a general view, displaying an event display image on the general view so as to cause the event display image to correspond to the monitoring target stored in the event information memory, wherein the event display image is an image including:
a circular portion indicating a predetermined time in a circumferential direction;
an indicator indicating a current hour or minute; and
an event occurrence time display portion displayed on the circular portion and caused to correspond to the occurrence time of the event, and wherein:
the circular portion indicates the predetermined time before a current time, and the event occurrence time display portion indicates, in an event that occurred in the past, a time from the occurrence time of the event to a solution time of the event, and in an event that is continuing at the current time, a time from the occurrence time of the event to the current time.

8. An information display program stored in a non-transitory computer readable storage medium for causing a computer to execute:

a readout step of reading from an event information memory, an occurrence time of an event, the occurrence time corresponding to each of monitoring targets in which the events occurred, or monitoring targets in which the events are scheduled to occur among a plurality of the monitoring targets; and a drawing step of drawing based on position information for displaying each of a plurality of monitoring targets on a general view, an event display image on the general view so as to allow the event display image to correspond to the monitoring target in which the event occurred, or the monitoring target in which the event is scheduled to occur, the events being read out from the event information memory, wherein the drawing step causes the computer to execute a step of drawing as the event display image:

a circular portion indicating a predetermined time in a circumferential direction;

an indicator indicating a current hour or minute; and an event occurrence time display portion displayed on the circular portion and caused to correspond to the occurrence time of the event, and wherein the circular portion indicates the predetermined time before a current time, and the event occurrence time display portion indicates, in an event that occurred in the past, a time from the occurrence time of the event to a solution time of the event, and in an event that is continuing at the current time, a time from the occurrence time of the event to the current time.

9. The information display device according to claim 1, wherein:

the general view is a map, and the drawing controller draws each event display image corresponding to each of the plurality of monitoring targets on the map, based on position information of each of the plurality of monitoring targets.

\* \* \* \* \*